United States Patent [19]

LaBuda et al.

[11] 4,280,608

[45] Jul. 28, 1981

[54] SELF-CONTAINED BELLEVILLE SPRING-TYPE WET CLUTCH

[75] Inventors: Edward F. LaBuda, Sterling Heights; Ting M. Wang, Warren, both of Mich.

[73] Assignee: Borg-Warner Corporation, Chicago, Ill.

[21] Appl. No.: 22,902

[22] Filed: Mar. 22, 1979

Related U.S. Application Data

[63] Continuation of Ser. No. 860,347, Dec. 14, 1977, abandoned.

[51] Int. Cl.³ .............................................. F16D 13/72
[52] U.S. Cl. .................................................. 192/113 B
[58] Field of Search ............. 192/113 A, 113 B, 89 B, 192/98, 99 A, 12 A, 12 C, 17 A, 70.12, 85 C, 85 CA, 110 R, 110 B

[56] References Cited

U.S. PATENT DOCUMENTS

| 3,330,391 | 7/1967 | Mamo | 192/113 B |
| 3,334,717 | 8/1967 | Spokas et al. | 192/113 B |
| 3,610,384 | 10/1971 | Borck | 192/113 B |
| 3,687,253 | 8/1972 | Bjorklund | 192/113 B |

FOREIGN PATENT DOCUMENTS 2422626 5/1975 Fed. Rep. of Germany ....... 192/113 B

*Primary Examiner*—George H. Krizmanich
*Attorney, Agent, or Firm*—James A. Geppert

[57] ABSTRACT

A self-contained wet clutch assembly of the Belleville spring type having a two-piece cover mated to a clutch member and sealed together as a unit, with the sealed clutch assembly operatively connected to and driven through a drive plate on the engine crankshaft, thus eliminating the conventional flywheel for the clutch assembly. The clutch assembly includes turbulizer vanes in the wet clutch housing to increase oil splash and enhance the cooling effect of the oil and to retard the clutch member. Also, a radial-type driven member retarding brake is inserted into the bearing carrier for the clutch release bearing.

30 Claims, 6 Drawing Figures

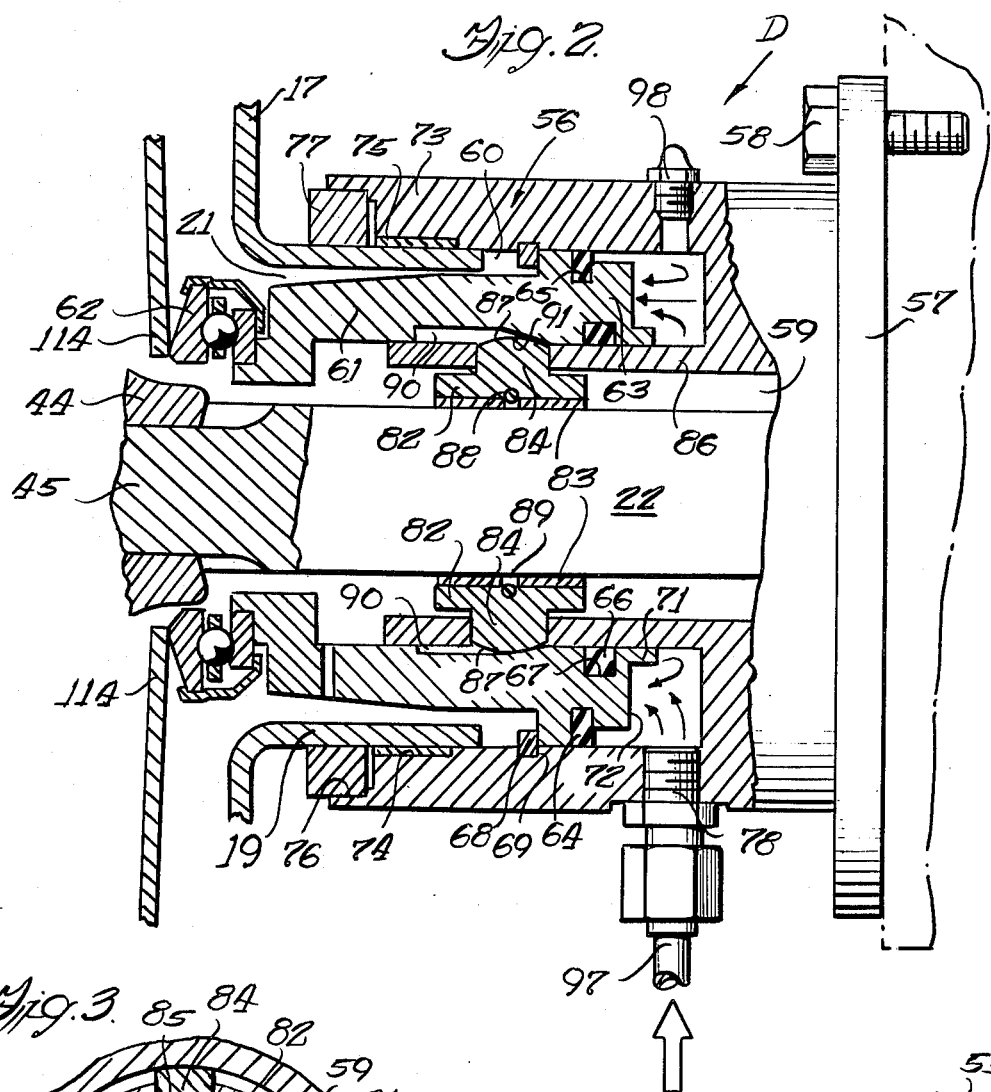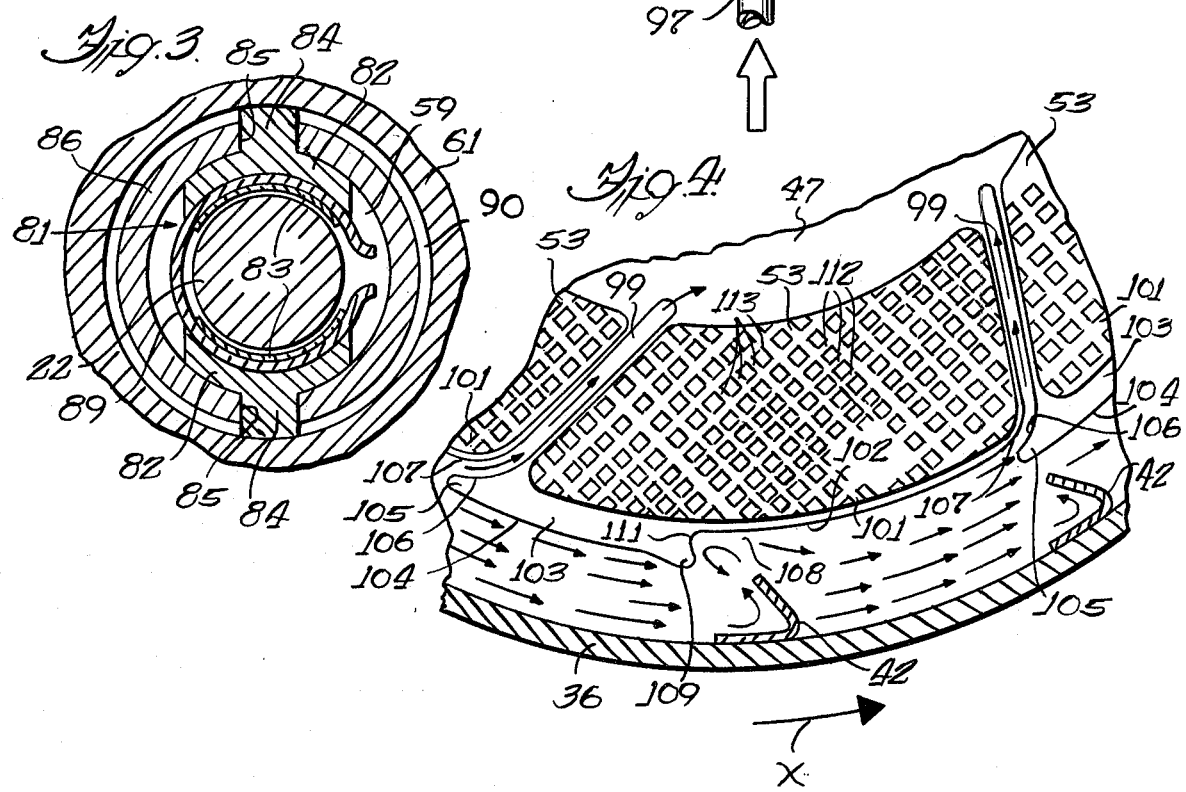

SELF-CONTAINED BELLEVILLE SPRING-TYPE WET CLUTCH

This is a continuation of application Ser. No. 860,347 filed Dec. 14, 1977, now abandoned.

BACKGROUND OF THE INVENTION

Dissipation of heat from friction linings of clutch plates has long been a problem during operation of the clutch to engage or disengage the manual transmission from a vehicle engine. Fluid has been introduced within the clutch assembly to be forced between the friction linings and the pressure plate and flywheel as a solution to the problem, but this solution is complicated by the centrifugal force developed on the fluid while the clutch is rotating tending to sling the fluid radially outwardly of the plates. Even where the fluid has been successful in the cooling of the friction linings, a further problem of leakage of the cooling fluid from the clutch assembly is encountered because most wet clutches are adapted to the engine flywheel to make up the containment package. The present invention effectively solves the leakage problem in providing a truly self-contained wet clutch assembly.

SUMMARY OF THE INVENTION

The present invention comprehends the provision of a self-contained wet clutch assembly that mates the wet clutch driven member to a cover wherein the assembly is suitably sealed together as a unit. The sealed assembly is mounted on and operatively connected to the engine crankshaft through a series of mounting bosses or inertia weights on the cover secured to a drive plate mounted on the crankshaft. This arrangement eliminates the necessity of a flywheel on the crankshaft. Without the flywheel, the sealed unit obviates the oil leakage problem of prior wet clutches.

The present invention also comprehends the provision of a self-contained sealed wet clutch assembly having a release or throw-out bearing to engage the spring fingers of the Belleville spring within the sealed assembly, wherein the bearing carrier takes the form of a concentric hydraulic piston in a hydraulic cylinder mounted to the transmission face. The piston in the cylinder is actuated through a master cylinder that is hydraulically connected thereto and is actuated through the clutch pedal by the vehicle operator.

The present invention further comprehends the provision of a retarding brake adapted to engage the driven shaft when the clutch assembly is disengaged through actuation of the release bearing carrier by the vehicle operator. The retarding brake is of the radial type and is housed in the stationary cylinder portion carrying the actuating piston for the release bearing. The retarding brake comprises a pair of diametrically opposed braking elements that are normally biased away from the driven shaft and, upon movement of the piston and release bearing to disengage the clutch, the braking elements are cammed into engagement with the shaft.

The present invention also comprehends the provision of turbulizer vanes on the interior surface of the clutch housing to increase oil splash and enhance movement of the oil between the clutch plate and the pressure plate and housing for cooling of the elements. The increase of oil splash also reacts with protruding diverters on the periphery of the clutch plate and retards the clutch plate or driven member.

The present invention further comprehends the provision of a self-contained wet clutch that is adaptable to a single clutch plate or a multi-plate clutch construction.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 2 is an enlarged vertical cross sectional view through the release bearing, carrier and actuating piston with the clutch in disengaged position.

FIG. 3 is a vertical cross sectional view taken on the line 3—3 of FIG. 1.

FIG. 4 is a vertical cross sectional view taken on the line 4—4 of FIG. 1.

DESCRIPTION OF THE PREFERRED EMBODIMENTS

Figure 1:
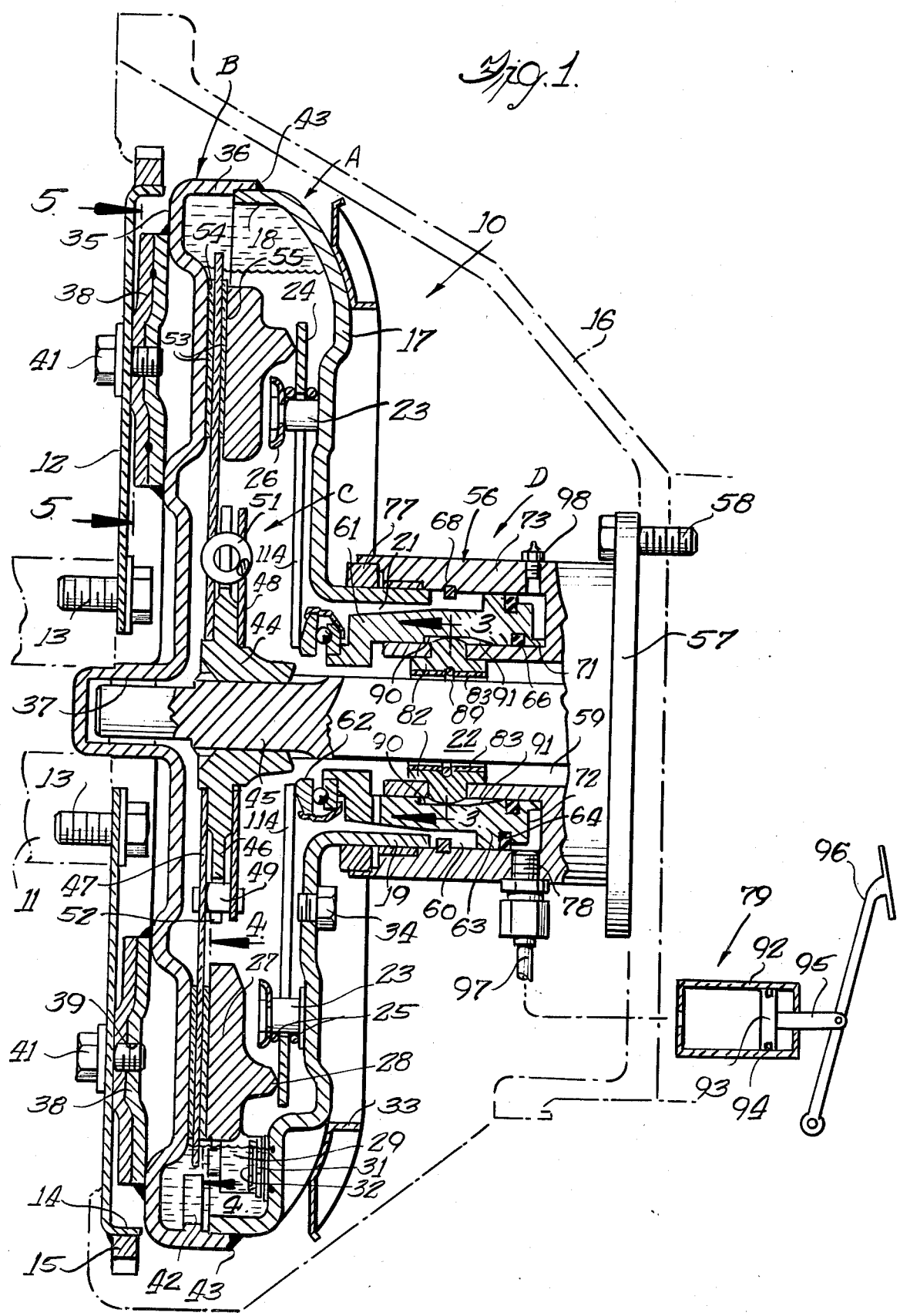
FIG. 1 is a vertical cross sectional view through a self-contained wet clutch of the present invention with a master cylinder and clutch pedal being shown diagrammatically.

Referring more particularly to the disclosure in the drawings wherein are shown illustrative embodiments of the present invention, FIG. 1 discloses a self-contained clutch assembly 10 that is suitably sealed and eliminates the necessity for a flywheel as is conventionally found mounted on an engine crankshaft 11. A drive plate 12 is substituted for the flywheel and is secured to the crankshaft by bolts 13. The drive plate has an outer peripheral flange 14 with a starter gear 15 suitably secured thereto, such as by welding. A bell housing 16 encompasses the clutch assembly 10 and is adapted to be secured to the engine for the vehicle and to the transmission housing.

The clutch assembly 10 includes a rear cover assembly A and a front cover assembly B. The rear cover assembly A comprises a rear cover 17 having an outer forwardly extending annular flange 18 and an inner rearwardly extending annular flange 19 defining a central opening 21 for a transmission input shaft 22. A plurality of rivets 23 are secured in the cover 17 to support a Belleville or diaphragm type spring 24 and annular fulcrum wires 25, 25, with an annular ring 26 secured to the inner ends of the rivets 23. A pressure plate 27 has a rearwardly extending annular fulcrum surface 28 engaging the spring 24 and a plurality of radial lugs 29. A plurality of drive straps 31 are secured at their ends to the lugs 29 and at their opposite ends to the cover 17 by rivets 32 so as to provide a driving connection between the pressure plate 27 and the cover 17. The drive straps 31 are also deformed so as to act as retractor springs for the pressure plate when the clutch is disengaged. A blower 33 is spot welded to the exterior surface of the cover 17 for cooling purposes, and a fluid fill plug 34 is located in the cover 17.

Figure 5:
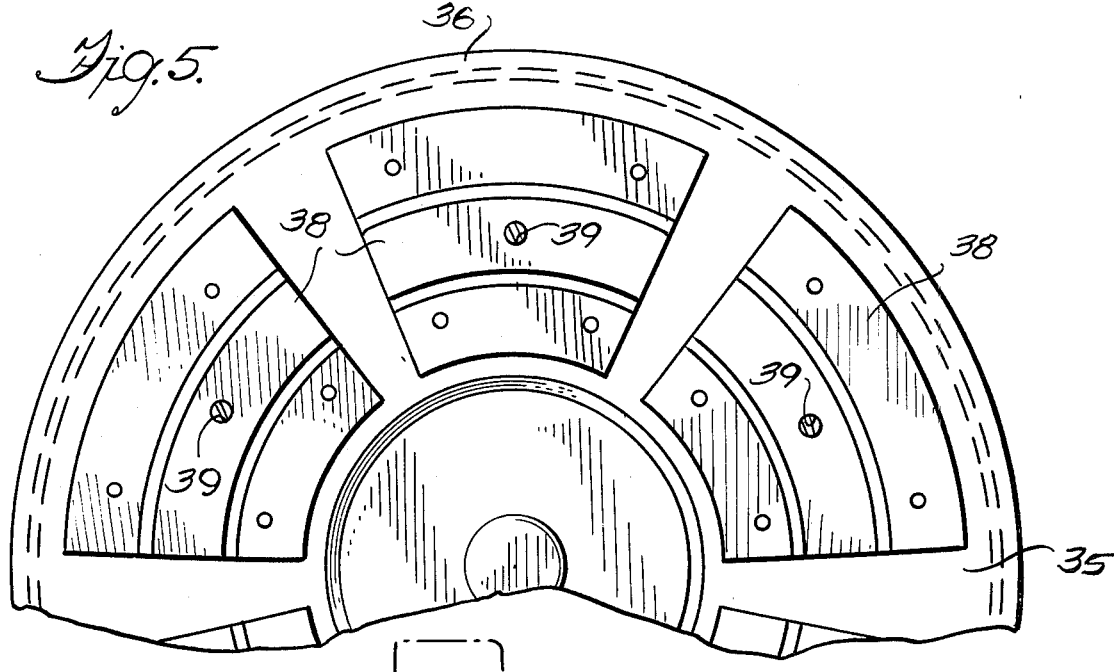
FIG. 5 is a vertical cross sectional view taken on the line 5—5 of FIG. 1.

The front cover assembly B includes a front cover 35 having an outer rearwardly extending annular flange 36 and an inner pilot bushing 37 for piloting the inner end of the transmission input shaft 22. A plurality of segmental inertia weights 38 (FIGS. 1 and 5) are welded to the cover 35 and are provided with threaded openings 39 to receive bolts 41 securing the drive plate 12 to the front cover assembly B. Turbulizer vanes 42 are secured, as by spot welding, to the interior surface of the flange 36 to aid in fluid distribution. The rear cover assembly A and the front cover assembly B are mated together with the flanges 18 and 36 nested and seal welded at 43 to form a completely self-contained unit to contain the cooling fluid.

Housed in the sealed cover assembly is a driven member assembly C comprising an internally splined hub 44 receiving an exteriorly splined portion 45 of the shaft 22, the hub having an integral radial flange 46. A clutch plate 47 and a spring retainer plate 48 sandwich the flange 46 and are secured together by shouldered rivets 49 and piloted on the hub by compression springs 51 received in pockets defined by aligned openings in the flange 46 and plates 47 and 48. The flange 46 has circumferentially spaced notches 52 receiving the rivets 49 to limit the relative rotation between the flange and the plates allowed by the compression springs. The clutch plate 47 has oppositely disposed friction material surfaces 53, 53 positioned adjacent the outer periphery of the plate so as to engage an annular friction surface 54 formed in the cover 35 and the friction surface 55 of the pressure plate 27.

A slave cylinder assembly D is provided at the rear end of the clutch assembly and includes a hollow ram-type cylinder housing 56 having a radial flange 57 at the rear end secured by bolts 58 to the bell housing 16. The housing provides a central passage 59 receiving the transmission input shaft 22 and an annular chamber 60 receiving a reciprocable bearing carrier 61 with a clutch throw-out bearing 62 press-mounted on the forward end and an enlarged piston 63 forming the rear end of the carrier. A lip-type seal 64 is provided in an annular groove 65 on the exterior surface of the piston, and an O-ring type seal 66 is provided in an annular groove 67 on the internal diameter of the piston, with the seals slidingly engaging the chamber walls. Also, a snap ring 68 is provided in an annular groove 69 in the wall of the chamber 60 to limit the forward travel of the piston; the piston having an annular flange 71 at its rear end adapted to abut the rear end of the chamber to limit rearward travel and provide a substantial area of the piston face 72 exposed to actuating hydraulic fluid.

The cylinder housing includes an outer wall 73 counterbored at 74 to receive a bearing 75, such as a bronze bushing, and having an enlarged counterbore 76 to receive an oil seal 77 pressed thereinto. The inner flange 19 of the rear cover 17 is sealingly received within the oil seal 77 and rotatably received in the bearing 75 so that the rear cover assembly A, front cover assembly B and driven member assembly C can rotate relative to the stationary slave cylinder assembly D. A hydraulic fitting 78 is positioned in the housing 56 to communicate with the rear end of the chamber 60 and to connect the chamber with a master cylinder 79 removed from the clutch assembly.

A transmission input shaft retarder 81 is provided in the housing passage 59 to retard or brake rotation of the transmission input shaft 22 when the clutch is disengaged. The retarder comprises a pair of arcuate metallic shoes 82, 82 on diametrically opposite sides of the shaft 22 with bonded friction linings 83, 83 on the inner curved surfaces of the shoes facing the shaft. Each shoe has a central projection 84 received in a slot 85 in the inner wall 86 of the housing 56 with a curved upper surface 87 extending into the chamber 60. A central groove 88 in each shoe receives a spring clip 89 to hold the shoes in place and act as a retractor spring at the time of clutch re-engagement. The interior wall of the bearing carrier 61 is provided with an annular groove 90 receiving the curved end surfaces 87, 87 of the projections 84, 84; the rear end of the groove being provided with a camming ramp 91 acting to urge the shoes 82, 82 inwardly to contact the shaft 22 as will be later described.

The master cylinder 79 comprises a housing 92 for a reciprocable piston 93 having a seal 94, and a push rod 95 secured to the piston and extending from the cylinder to be pivotally mounted at the free end on a push-type pedal 96 to be actuated by the vehicle operator. The cylinder 79, connecting conduit 97 and chamber 60 behind the piston 63 are filled with hydraulic fluid; the cylinder housing 56 having a bleeder valve 98 acting to purge the hydraulic system of entrapped air.

As more clearly seen in FIG. 4, the clutch plate 47 is provided with several diagonally extending slots 99 partially dividing the plate into a plurality of circumferentially spaced segments 101, the slots 99 extending from the outer periphery 102 of the plate to an inner peripheral portion thereof. Associated with the slots are fluid diverters or scoops 103 at the outer edge of each segment 101; each diverter being integral with the plate and having an outer peripheral edge 104 with the forward or leading portion formed as a finger 105 in overlapping relation to the slot 99 immediately ahead of the segment. The inner edge 106 of the finger is a curved fluid scooping surface generally parallel with the curved edge 107 of the adjacent trailing portion of the segment thereahead. At the trailing edge of each scoop 103 is a pocket 108 defined by a rearwardly and slightly outwardly extending finger 109 having a concave edge 111 joining the finger to the plate periphery.

It should be understood that the terms "leading" and "trailing" used with reference to the fluid diverters refer to the direction of relative rotation between the cover assembly A and B and the driven clutch plate 47. The clutch plate 47 is rotating in the same direction as the cover assembly, however, until full clutch engagement, the plate 47 rotates slower than the cover assembly; thus having a direction of relative rotation opposite to the arrow X of FIG. 4. The friction pads 53 on the clutch plate segments 101 each has a waffle grid formed thereon by intersecting grooves 112 and 113.

With the vehicle engine running, the clutch assembly 10 is normally engaged through the load imparted by the Belleville spring 24 against the fulcrum surface 28 of the pressure plate 27 to urge the pressure plate against the clutch plate 47 and the friction surface 54 of the front cover 35 so that the driven member assembly C rotates with the sealed rear cover assembly A and front cover assembly B to rotate the transmission input shaft 22. The positioning of the parts of the clutch assembly with the clutch engaged is shown in FIG. 1. The inner ends of the spring fingers 114 of the spring 24 are in constant engagement with the clutch throw-out bearing 62.

To release the driven member C from the pressure plate 27 and the front cover 35 for the purpose of shifting gears, the operator depresses the clutch pedal 96 to force fluid from the cylinder 79 by means of the piston 93 into the annular chamber 60 behind the piston 63, thus imparting hydraulic force against the piston face 72 to shift the bearing carrier 61 forwardly to the position shown in FIG. 2. The throw-out bearing 62 moves against the fingers 114 of the Belleville spring 24 to unload the pressure plate 27, with the drive straps 31 acting to retract the pressure plate.

At the same time, the camming ramp 91 is moved relative to the retarder 81 and engage the curved surfaces 87, 87 to urge the shoes 82, 82 and friction linings 83, 83 radially inward against the force of the spring 89 to engage the rotating shaft 22. The engagement between the shoes and the shaft acts to retard rotation thereof and, as the housing assembly A and B is decreasing in rotation due to the closed throttle of the engine, the fluid tends to continue at a high velocity due to its inertia, thus impinging on the turbulizer vanes 42 and forcing the fluid into the path of the fingers 109 of the diverters 103 (as seen in FIG. 4) to aid in retardation of the clutch plate 47 and driven member assembly C. The fluid acting on the vanes 42 and the diverters 103 aids in heat dissipation and lubrication of the clutch with a portion of the fluid being forced through the slots 99 and the lining grooves 112, 113 toward the center of the unit.

Another purpose of the turbulizer vanes 42 is to act as a reserve means of diverting fluid onto the driven member 47 in the event that the dynamic oil level falls below the required level, thereby rendering the driven member diverters 103 inoperative.

Once the gears are shifted, the operator gradually releases the pedal 96 and the spring 24 through the fingers 114 acts to urge the bearing 62 and bearing carrier 61 rearwardly to force the fluid back into the cylinder 79. Initial movement of the carrier 61 releases the shaft retarder shoes 82, 82 from the camming ramp 91 for retraction by the spring 89, and the spring 24 fulcrums about the wire 25 to urge the pressure plate 27 against the clutch plate 47 and the front cover 35. As the friction surfaces begin to engage and the throttle causes rotation of the cover assembly A and B, the fluid is moved in the cover assembly faster than rotation of the clutch plate and a portion of the fluid is scooped up by the diverters 103 to enter the slots 99 and travel toward the center of the unit and then urged outward through the grooves 112, 113 by centrifugal force to cool and lubricate the assembly. When the clutch is fully engaged, the scooping of the fluid ceases as there is no relative rotation between the cover assembly A and B and the clutch driven assembly C.

Figure 6:
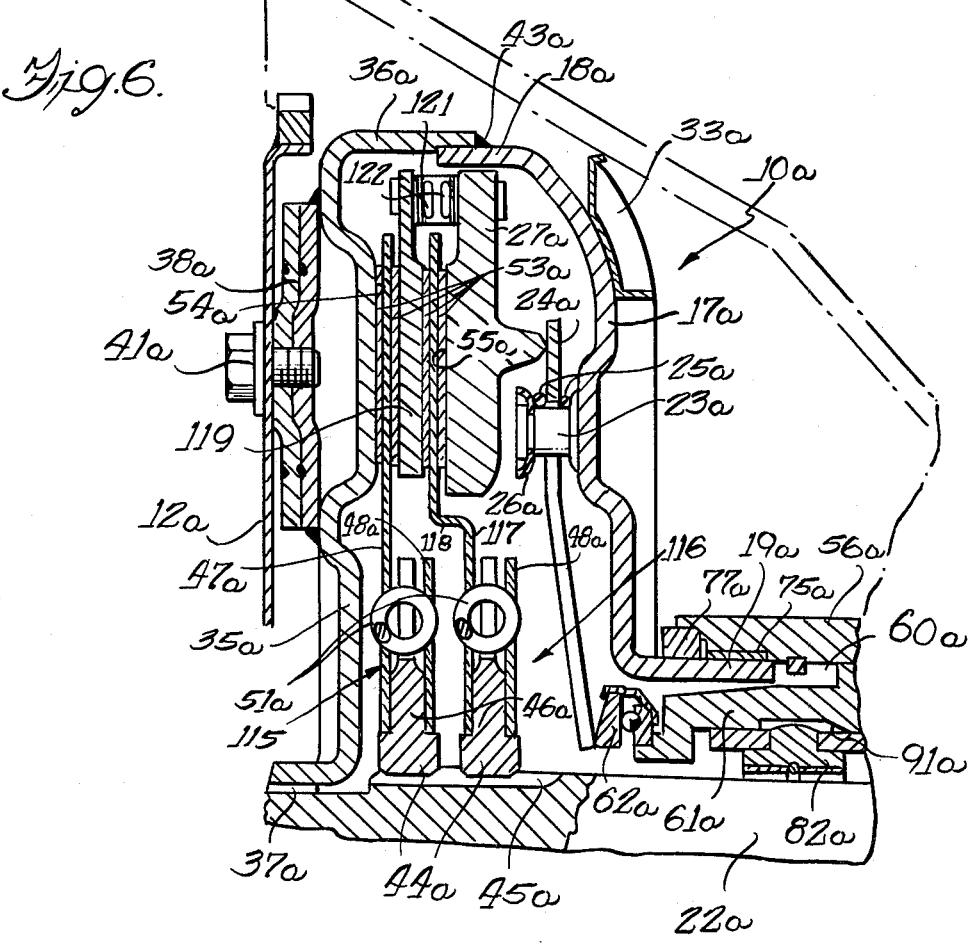
FIG. 6 is a partial vertical cross sectional view similar to FIG. 1 but showing a multi-plate clutch assembly.

FIG. 6 discloses an alternate embodiment of self-contained wet clutch utilizing a multi-plate driven member, and parts identical to those of the previously described assembly will have the same reference numeral with a script a. In this embodiment, the clutch assembly 10a includes a rear cover 17a with an outer flange 18a and an inner flange 19a, shouldered rivets 23a supporting the fulcrum wires 25a and support ring 26a for the Belleville spring 24a, and the blower 33a secured to the outer rear surface of the cover. A front cover 35a has an outer flange 36a telescopingly receiving the flange 18a, segmental inertia weights 38a welded to the cover 35a and an inner pilot bushing 37a receiving the inner end of the transmission input shaft 22a. A drive plate 12a secured to the engine crankshaft (not shown) is secured to the segmental weights 38a by bolts 41a. The flanges 18a and 36a are seal welded at 43a.

The driven member assembly includes a pair of clutch members 115 and 116, each clutch member having a hub 44a on the splined portion 45a of the transmission input shaft 22a with an integral radial flange 46a.

Each hub flange is sandwiched between a clutch plate 47a, 117 and spring retainer plates 48a, 48a, and compression springs 51a are received in aligned windows for a vibration damper. Each clutch plate has clutch friction pads 53a similar to those shown in FIG. 4. The clutch plate 47a is adapted to engage the friction surface 54a of the front cover 35a while the clutch plate 117 has an offset 118 so as to contact the friction surface 55a of the pressure plate 27a. An intermediate pressure plate 119 is interposed between the clutch plates 47a, 117 to frictionally engage the friction pads 53a of each; the intermediate plate being connected to the pressure plate 27a by drive straps 121 secured to each member by rivets 122.

The concentric hydraulic slave cylinder includes a housing 56a for a bearing carrier 61a in a chamber 60a supporting a clutch throw-out bearing 62a. Shaft retarder shoes 82a are mounted in the housing to cooperate with the camming ramp 91a to engage the input shaft 22a when the clutch is disengaged. A bushing 75a and an oil seal 77a are pressed in the housing 56a to rotatably support the inner flange 19a of the rotating cover assembly. This clutch arrangement operates in substantially the same manner as previously described for the embodiment of FIGS. 1 through 5.

We claim:

1. A self-contained wet clutch assembly adapted to be mounted on a transmission input shaft, comprising a front cover assembly, a rear cover assembly, a clutch plate assembly, and a concentric slave cylinder assembly, said front cover assembly including a front cover having an outer peripheral flange, said rear cover assembly including a rear cover having outer and inner peripheral flanges extending in opposite directions, said outer peripheral flanges of the front and rear covers conformably telescoping and seal welded together, said clutch plate assembly being located within the sealed front and rear covers and operatively connected onto said transmission shaft, said slave cylinder assembly rigidly mounted on a transmission housing receiving said transmission input shaft and including a bearing and an oil seal receiving the inner flange of the rear cover to provide a completely sealed assembly.

2. A self-contained wet clutch assembly as set forth in claim 1, in which a plurality of circumferentially spaced inertia weights are mounted on said front cover and adapted to be secured on a radial flange of an engine output shaft providing the driving torque for the assembly.

3. A self-contained wet clutch assembly as set forth in claim 1, in which said rear cover assembly includes an annular pressure plate and a diaphragm type spring fulcrumed on the rear cover to urge the pressure plate toward the clutch plate assembly.

4. A self-contained wet clutch assembly as set forth in claim 3, including a blower secured to the exterior surface of said rear cover.

5. A self-contained wet clutch assembly as set forth in claim 1, including a plurality of turbulizer vanes secured to the interior surface of the outer peripheral flange of said front cover.

6. A self-contained wet clutch assembly as set forth in claim 5, in which said turbulizer vanes increase oil splash and act to retard rotation of the clutch plate assembly.

7. A self-contained wet clutch assembly as set forth in claim 1, in which said slave cylinder assembly includes a housing having an annular chamber concentric with said transmission shaft, an annular bearing carrier received in said chamber and adapted to be hydraulically actuated, a clutch release bearing mounted on the inner end of said bearing carrier, and a diaphragm-type spring mounted to fulcrum on said rear cover and engaged by said release bearing.

8. A self-contained wet clutch assembly as set forth in claim 7, in which a concentric piston is formed on the end of the bearing carrier opposite the clutch release bearing and is conformably received in said chamber.

9. A self-contained wet clutch assembly as set forth in claim 8, in which a concentric annular flange projects axially from the rear end of the piston to contact the rear end of the chamber and provide a spacing to allow the rear face of the piston to be exposed to hydraulic fluid.

10. A self-contained wet clutch assembly as set forth in claim 9, including a source of hydraulic fluid for said chamber adapted to be pressurized by a vehicle operator.

11. A self-contained wet clutch assembly as set forth in claim 10, in which a pedal-actuated master cylinder is the hydraulic fluid source.

12. A self-contained wet clutch assembly as set forth in claim 7, in which said housing is radially spaced from said transmission shaft, and a pair of diametrically oppositely disposed shaft retarders are located in the space between the housing and the shaft and adapted to be actuated upon movement of said bearing carrier to disengage the clutch.

13. A self-contained wet clutch assembly as set forth in claim 12, in which each shaft retarder comprises an arcuate shoe having a radial projection, said housing having a slot receiving said projection, and said bearing carrier having a longitudinally extending annular camming groove receiving said projection.

14. A self-contained wet clutch assembly as set forth in claim 13, including a spring clip acting as a retractor spring, each retarder shoe having a groove in the interior surface receiving said retractor spring.

15. A self-contained wet clutch assembly as set forth in claim 13, in which the internal curved surface of each shoe has a friction lining to engage said transmission input shaft.

16. A self-contained wet clutch assembly as set forth in claim 13, in which said annular groove is of a constant depth with an inclined camming portion at one end.

17. A self-contained wet clutch assembly as set forth in claim 7, including a stop ring in said chamber adapted to engage said piston so as to limit axial movement of said bearing carrier.

18. A self-contained wet clutch assembly as set forth in claim 1, in which said clutch plate assembly comprises at least one clutch plate operatively connected to a hub on said transmission input shaft, said clutch plate having a friction pad on each surface and a plurality of diagonally extending slots partially dividing the plate and friction pads into a plurality of segments, and a diverter on the outer periphery of each segment providing a coolant fluid scooping surface projecting in a direction counter to the direction of rotation of the clutch housing so as to direct fluid into the adjacent slot.

19. A self-contained wet clutch assembly as set forth in claim 18, in which said friction pads have intersecting grooves forming a waffle pad, at least some of said grooves intersecting an adjacent slot.

20. A self-contained wet clutch assembly as set forth in claim 18, including a plurality of turbulizer vanes located on the interior surface of the front cover flange acting to increase oil splash in cooperation with said diverters.

21. A self-contained wet clutch assembly as set forth in claim 18, in which a pair of clutch plates are mounted on said transmission input shaft, and an intermediate pressure plate is interposed between said clutch plates and operatively connected to a primary pressure plate for rotation therewith.

22. A self-contained wet clutch assembly as set forth in claim 21, including a plurality of drive straps connecting said primary pressure plate to said rear cover, and a plurality of drive straps connecting said intermediate pressure plate to said primary pressure plate.

23. A self-contained wet clutch assembly adapted to be concentrically mounted on a transmission input shaft leading to a vehicle transmission, comprising a front cover assembly including a front cover having an outer peripheral flange and a central pilot bushing rotatably receiving the free end of said transmission input shaft, a plurality of inertia weights secured to said front cover and adapted to be connected to a radial flange of an engine output shaft, a rear cover assembly including a rear cover having an outer peripheral flange and an inner peripheral flange extending in opposite directions, an annular pressure plate and a diaphragm spring each operatively connected to said rear cover, said outer peripheral flanges partially telescoping and seal welded together, a clutch plate assembly located within said covers and having a hub mounted on said transmission input shaft for rotation therewith and a clutch plate operatively connected with said hub and positioned between said pressure plate and a friction surface formed on said front cover, and a concentric slave cylinder assembly rigidly mounted on the transmission housing to encompass said transmission input shaft, said slave cylinder assembly including an annular housing receiving said transmission input shaft therethrough, and having an annular chamber therein, a bearing and an oil seal in said housing rotatably receiving and sealingly engaging said inner peripheral flange on the rear cover, an annular bearing carrier reciprocably mounted in said annular chamber, a clutch release bearing mounted on the end of said carrier and engaging said diaphragm spring, a piston on the opposite end of said carrier sealingly received in said chamber and adapted to be hydraulically actuated to advance said bearing carrier toward said diaphragm spring.

24. A self-contained wet clutch assembly as set forth in claim 23, including a concentric annular flange projecting axially from the rear face of said piston adapted to contact the rear wall of said chamber and space the rear face of the piston therefrom for exposure to hydraulic actuating fluid.

25. A self-contained wet clutch assembly as set forth in claim 24, including a vehicle operator actuated hydraulic master cylinder providing a source of pressurized hydraulic fluid for said annular chamber behind the piston.

26. A self-contained wet clutch assembly as set forth in claim 23, including means adapted to retard the rotation of the transmission input shaft upon clutch disengagement.

27. A self-contained wet clutch assembly as set forth in claim 26, in which said retarding means includes a plurality of turbulizer vanes positioned on the interior surface of the front cover flange acting to increse oil splash and cooperating with said clutch plate to retard the rotation thereof.

28. A self-contained wet clutch assembly as set forth in claim 26, in which said retarding means includes a pair of diametrically opposed arcuate retarder shoes located in said housing with inner friction facings facing said transmission input shaft, each shoe having a projection extending through said housing into the annular chamber, said bearing carrier having a longitudinally extending annular groove receiving the end of each projection, an inclined camming surface at the rear end of said groove, and a retractor spring received in an inwardly opening groove in each shoe.

29. A self-contained wet clutch assembly as set forth in claim 24, including a stop ring in said annular chamber to limit forward movement of said piston.

30. A self-contained wet clutch assembly as set forth in claim 23, including a blower secured to the exterior surface of said rear cover, and said clutch plate includes a plurality of diagonal slots partially dividing said plate into segments, and a diverter on the outer periphery of each segment and having a finger extending in a direction counter to the direction of rotation of the clutch cover to provide a coolant fluid scooping surface.

* * * * *